United States Patent [19]
Torpey et al.

[11] 3,849,304
[45] Nov. 19, 1974

[54] METHOD FOR THE PRIMARY AND SECONDARY TREATMENT OF WASTEWATER IN A UNITARY APPARATUS

[75] Inventors: Wilbur N. Torpey, Douglaston; Richard A. Sullivan, Woodside, both of N.Y.

[73] Assignee: Autotrol Corporation, Milwaukee, Wis.

[22] Filed: Aug. 9, 1973

[21] Appl. No.: 386,860

[52] U.S. Cl. .................... 210/14, 210/17, 210/151
[51] Int. Cl. ............................................. C02c 1/04
[58] Field of Search ............................ 210/14–17, 210/150, 151

[56] References Cited
UNITED STATES PATENTS

| | | | |
|---|---|---|---|
| 1,991,896 | 2/1935 | Hays | 210/17 |
| 3,466,241 | 9/1969 | Simpson | 210/17 |
| 3,703,462 | 11/1972 | Smith | 210/17 X |
| 3,776,841 | 12/1973 | Torpey | 210/17 |

Primary Examiner—Samih N. Zaharna
Assistant Examiner—Robert H. Spitzer
Attorney, Agent, or Firm—Kenneth A. Koch

[57] ABSTRACT

A method utilizing a composite apparatus for the treatment of wastewater to remove settleable and floatable solids and to remove and oxidize organic matter including a treatment tank having at least two horizontally adjacent bays, each of the bays having an upper biological treatment zone separated by a horizontally disposed baffle from a lower settling zone. Raw wastewater enters the lower settling zone of one of the bays wherein settleable and floatable solids are removed, and then turns vertically to flow in a reverse direction through the upper biological treatment zone of the first bay. From the first bay the wastewater is horizontally directed into and through the biological treatment zone of the second bay and is subsequently vertically directed into and through the lower settling zone of the second bay to the weir for collection of the treated fluid. Preferably, two secondary bays, each receiving about one half of the wastewater flow from the first bay, are provided.

7 Claims, 4 Drawing Figures

3,849,304

METHOD FOR THE PRIMARY AND SECONDARY TREATMENT OF WASTEWATER IN A UNITARY APPARATUS

BACKGROUND OF THE INVENTION

The invention pertains to the treatment of wastewater to remove pollutants. More specifically, the invention provides method and apparatus for the physical treatment of wastewater to remove particulate matter and biological treatment for the removal of organic material. The present invention employs rotating partially submerged biological contactors to grow aerobic biological slimes for the oxidation of organic pollutants and settling zones subjacent to the contactors for removal of both raw primary and secondary solids generated by the biological treatment from the wastewater.

U.S. Pat. No. 3,575,849 issued to Torpey discloses a method and apparatus for biologically treating wastewater including a treatment tank having a biological treatment zone in its upper portion and a quiesent settling zone in its lower protion. The biological treatment zone includes a plurality of parallel rotatable shafts disposed across the upper portion of the tank; each of the shafts supporting a plurality of biological contactors, typically thin discs. The contactors extend into the wastewater in the tank to less than half the tank depth, providing a subjacent settling zone for sloughed off solids. The surface of the biological contactors is alternately exposed to the atmosphere and immersed in the wastewater at suitable intervals to promote the growth of aerobic biological slimes.

The pending U.S. patent application Ser. No. 306,584 filed Nov. 14, 1972 by Torpey, discloses a wastewater treatment tank having an upper biological treatment zone including rotating partially submerged contactors to grow aerobic biological slimes and a subjacent settling zone. The subjacent settling zone is physically separated from the biological treatment zone by a false bottom or longitudinal baffle. Wastewater is introduced into the upper biological treatment zone, flows through the upper zone, around the longitudinal baffle and into and through the subjacent settling zone to a treated wastewater outlet.

The U.S. Pat. No. 3,563,383 to Hellquist, pertains to a method for treating organically polluted wastewater including biological treatment using partially submerged contactors in the upper portion of a section of the treatment unit. The Hellquist system separates primary from secondary treatment as it utilizes a plurality of separate bays arranged in series for primary settling before the wastewater enters the biological treatment section.

SUMMARY OF THE INVENTION

The present invention provides a treatment tank having facilities for removing raw settleable and floatable matter from wastewater, biologically treating the wastewater and subsequently removing the sloughed off biological slimes from the treated wastewater. The new method maximizes biological treatment in a tank of a predetermined volume resulting in BOD removals of up to 98 percent while utilizing the lower portions of the tank for the removal of both primary and secondary solids.

The new treatment tank, which can be an existing settling tank modified in accordance with the invention, has at least two, preferably three horizontally adjacent bays. Each bay includes an upper biological treatment zone employing rotating partially submerged contactors and a subjacent settling zone substantially coextensive with the upper zone.

A horizontally disposed baffle is located in each bay immediately below the contactors to physically separate each bay into vertically adjacent treatment zones.

In accordance with a specific aspect of the invention, one of the horizontally adjacent bays, preferably the center one of a three bay facility is supplied with raw untreated wastewater, typically normal domestic wastewater. The influent enters the lower settling zone of this bay, hereinafter referred to as the primary bay, wherein primary treatment is effected by sedimentation. The wastewater flows through the lower zone of the primary bay, upwardly around the longitudinal baffle and through the upper zone wherein soluble pollutants are oxidized by the aerobic slimes that frow and are maintained on the rotating contactors. The effluent partially treated wastewater from the primary bay is then folded horizontally and introduced into the upper biological treatment zone of the secondary bay or bays adjacent to the primary bay wherein further oxidation of organic pollutants is effected. After passing through the biological treatment zones of the secondary bay or bays the wastewater is folded vertically around the horizontal baffles and into the secondary settling zones wherein residual solids, primarily mature slimes sloughed off from the contactors, are removed from the wastewater. The wastewater after passing through the secondary settling zones is withdrawn. When the primary bay is the center unit of a three bay installation, the effluent flow from the biological treatment zone of the primary bay is split into two substantially equal portions each of which is supplied to the biological treatment zone of a secondary bay.

DESCRIPTION OF PREFERRED EMBODIMENTS

Figure 1:
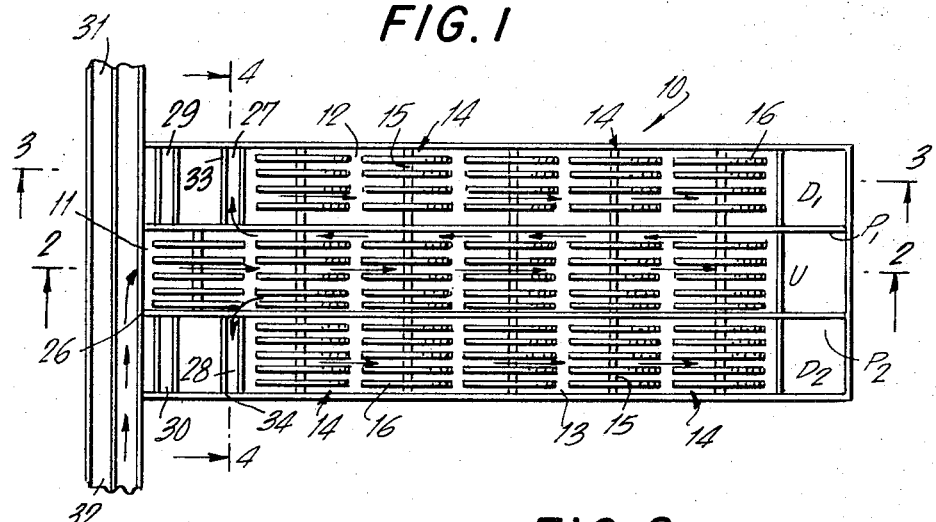
FIG. 1 is a plan view of a treatment tank according to the invention.

Referring to the drawing, a three bay treatment tank 10 embodying the principles of the invention is shown. The treatment tank 10 is composed of a central or primary bay 11 and a pair of secondary bays 12 and 13 that are horizontally adjacent to bay 11 and separated therefrom by partitions $P_1$ and $P_2$. Each of the bays 11, 12 and 13 includes an upper biological treatment zone including a plurality of parallel biological contactor assemblies 14, which include a plurality of concentrically and fixedly mounted contactors 16, which provide surface area upon which biological slimes may grow. The shafts 15 are preferably mounted above the usual level of wastewater in the tank unit to simplify mechanical construction although submergence of the contactors 16 can be varied from about one-third to two-thirds of their diameter. FIG. 1 of the drawing shows a common shaft 15 for each bank of contactors extending across the three bays of tank 10. This arrangement simplifies the driving of the shafts to rotate the contactors but results in the contactors of the central or primary bay rotating in a direction counter to the direction of wastewater flow through the biological treatment zone of the primary bay 10 as shown by the arrows in FIG. 2. Alternatively, each of bays 11–13 can have independent contactor shafts that are rotated by separate driving means to rotate the separate banks of contactors in any desired direction.

Although the rotatable biological contactors of the invention may take different forms such as drums, cylinders, brushes or thin, closely spaced discs, it is preferred to use contactors having a discontinous honeycomb type structure such as that disclosed in pending U.S. application Ser. No. 252,038 filed May 10, 1972. Thin discs are also advantageous biological contactors since they facilitate a high concentration of surface area per unit volume of biological treatment zone and can be used to impart a mixing and pumping effect to the wastewater. Suitable biological contactors can be constructed of many available materials, although plastics are generally preferred.

As previously mentioned, driving means (not shown) are provided to rotate shafts 15 to impart a predetermined peripheral velocity to the contactors 16. Advantageously, the driving means are capable of imparting rotational forces to shafts 15 variable in magnitude and direction. This allows for the accommodation of varying wastewater flow rates through the tank 10 and provides for the mechanical removal of excessive slime growth from the surface of contactors 16 when and if desired. Preferably, the directional component of the peripheral velocity of the discs at their lowermost portion is in the direction of wastewater flow through the biological treatment zone of each bay.

Each of the bays 11, 12 and 13 is divided into two vertically adjacent treatment zones, physically separated by longitudinal baffle 17a, b and c. The upper portion of each bay, which encompasses the rotating contactor assemblies 14 is operated to perform the biological treatment function. The lower portion of each bay between the baffles 17a, b and c and the bottom of the tank is a subjacent sedimentation zone, generally indicated by the numbers 18a, b and c. Typically, a sludge collection mechanism 19 is provided at the bottom of each bay to remove the sludge to the sumps 20, 21 and 22 for withdrawal and to subsequent disposal (not shown). The sludge collection mechanism 19 can be chosen from those presently in widespread use.

In accordance with a specific aspect of the invention, the longitudinal baffles 17a, b and c, which form a false floor for each of the upper biological treatment zones, extends across the full width of each of bays 11, 12 and 13 and along substantially all, typically 85–95 percent, of the long dimension of the tank. A sufficient space between the end of the baffles 17a, b and c and the tank wall of tank 10, to permit the wastewater to pass vertically and then reverse direction and flow from the lower settling zone to the upper biological treatment zone as in the case of bay 12 or from the upper zone to the lower zones as in bays 11 and 13, is provided. An upflow zone U, including grease removing means, is provided in bay 11, while similar downflow zones $D_1$ and $D_2$ are shown for bays 12 and 13. The upward or downward velocity of the wastewater as it flows from zone to zone should be from about 3 to 15 feet per minute. In all three bays, the wastewater should travel through the settling zone countercurrently to the flow direction through the upper biological treatment zone of that bay.

Figure 2:
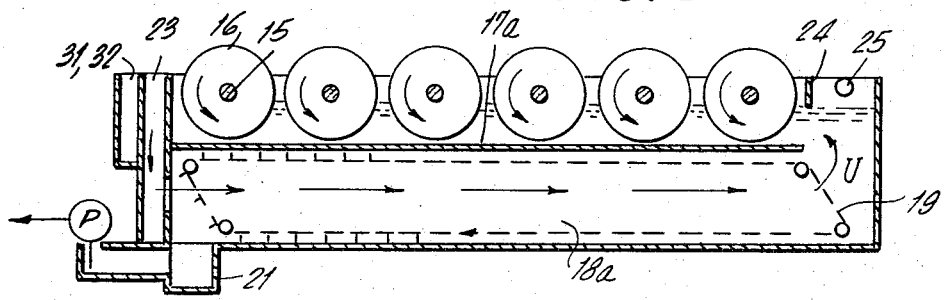
FIG. 2 is a cross-sectional elevation view taken along line 2—2 of FIG. 1.
Figure 3:
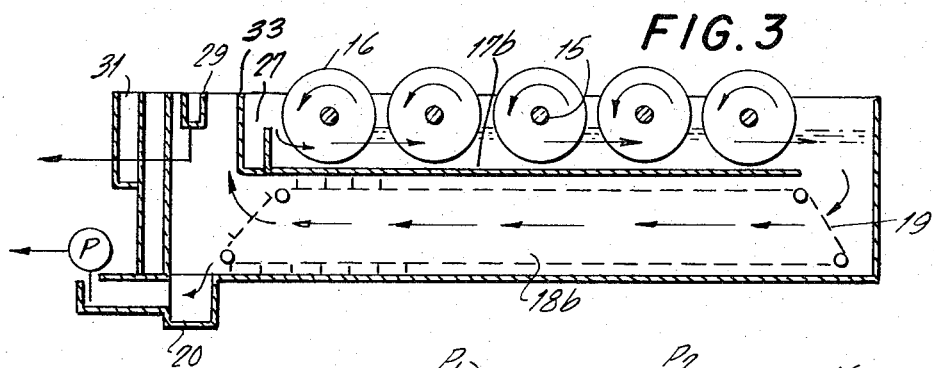
FIG. 3 is a cross-sectional elevation view taken along line 3—3 of FIG. 1.
Figure 4:
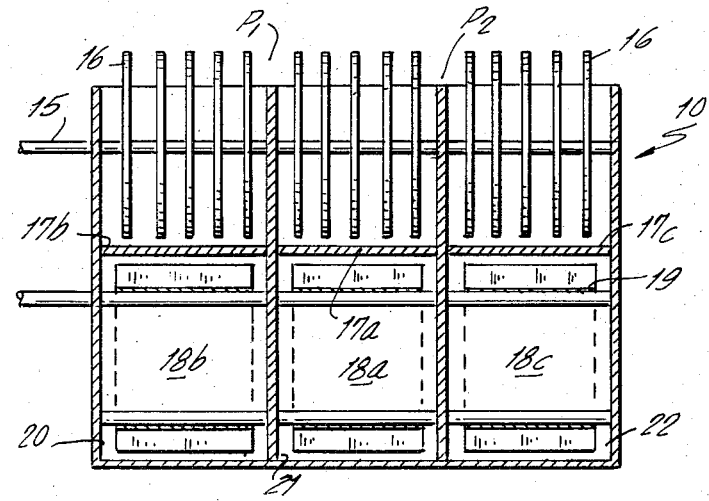
FIG. 4 is a cross-sectional elevation view taken along the line 4—4 of FIG. 1.

The primary bay 11 is shown in further detail in FIG. 2. Raw wastewater enters one end of the lower settling zone of bay 11 through inlet conduit 23 and flows beneath longitudinal baffle 17a as indicated by the arrows. Particulate organic matter as well as sand and other solids materials are removed from the wastewater in the lower settling zone 18a, by sedimentation; and transported along the tank bottom by the collection mechanism 19 to withdrawal sump 21. Collection mechanism 19 preferably includes flights that scrape grease or other foreign matter from the bottom of the longitudinal baffles as well as from the tank bottom of each bay. After passing through the primary settling zone, the wastewater flows upwardly through upflow zone U and into the biological treatment zone of the primary bay 11. A baffle 24 is provided to trap grease and means such as a grease ducking weir 25 can be used to removed trapped grease. The wastewater flows through the biological treatment zone of the primary bay wherein organic pollutants are oxidized thus furnishing the nutritional energy for the growth and maintenance of the biological slimes on the surface of contactors 16. Upon reaching the end of the biological treatment zone of the primary bay, indicated by wall 26 of tank 10, the wastewater flow is split horizontally as indicated by angular arrows in FIG. 1 into two substantially equal portions each of which enters biological treatment zones of the secondary bays 11 and 13 through channels 27 and 28.

The partially treated wastewater is subjected to further biological treatment by the action of aerobic slimes that grow and are maintained on the surface of contactors 16 in the upper zones of bays 12 and 13. Mature slimes are periodically sloughed off the contactor surface and are carried over with the wastewater through downflow zones $D_1$ and $D_2$ and into the subjacent settling zones 18b and 18c, wherein such solids are separated from the flow by sedimentation and transported by the collection mechanisms 19 to withdrawal sumps 20 and 22. The treated wastewater is removed from bays 12 and 13 by overflowing weirs 29 and 30 and flowing into outlet conduits 31 and 32, which can be subsequently joined into a common conduit. Vertical baffles 33 and 34 extending upwardly from longitudinal baffle 17b and c are provided to produce a stage effect for increasing the capacity of the installation to remove carbonaceous matter from wastewater.

Although it is preferred to split the wastewater leaving bay 11 into two or possibly more substantially equal portions and further processing each portion through an additional bay providing both biological and sedimentation functions, it is within the scope of the invention to utilize a two bay tank. The primary bay of a two bay unit would function as the bay 11 of the above-described unit, while the second bay would be the equivalent of either of bays 12 or 13. To compensate for the possible lack of sufficient sedimentation area in the lower settling zone of the secondary bay of a two bay unit, a downstream clarifier or micro-screening unit may be provided to remove carried over solids.

It is preferred to limit the immersion depth of contactors 16 to less than one half the depth of the bays. For practical purposes the diameter of contactors 16 will be between about 6 to 15 feet and immersion depth less than half of the diameter.

To encourage the growth of biological slimes by alternately immersing them in the wastewater and exposing them to the atmosphere, the contactor assemblies 14 are rotated at a suitable predetermined velocity. From a practical standpoint, the peripheral velocity of the discs should not exceed about 1 foot per second, and must be sufficiently high to avoid excessive time of immersion of the biological slimes. To provide the microorganisms in the slime with oxygen sufficient to satisfy their metabolic processes, the immersion time of the slimes typically should not exceed about 10 seconds in the first stage of treatment. As the wastewater becomes progressively clarified the immersion time of the slimes can be increased gradually to about 30 seconds. For smaller diameter contactors, the peripheral velocity can be reduced substantially while avoiding excessive immersion time, while the larger diameter contactors usually require that the rotational velocity be substantially increased to avoid excessive immersion time. Therefore, the peripheral velocity of the contactors 16 for normal operation should be about 0.5 and 1 foot per second.

The method and apparatus of the invention provides a relatively inexpensive and practical means for substantially upgrading wastewater treatment plants. The invention can be applied to primary sedimentation tanks, which were designed to remove only the settlable solids from the raw wastewater and can be modified to provide biological treatment in addition to their original function. Primary treatment plants that are presently removing about 30 percent of the $BOD_5$ in the wastewater can be upgraded economically to remove from 80–90 percent of $BOD_5$ by applying the principles of this invention to the plant.

The removal of carbonaceous pollutants is a function of the loading rate, e.g., gal/day/sq.ft of contactor area and the strength of the wastewater measured in terms of $BOD_5$. A 90 percent $BOD_5$ removal can be effected with a loading rate of 2 to 5 gal/day/sq.ft of contactor surface for normal wastewater and 80 percent BOD removal with a loading rate from 4 to 10 gal/day/sq.ft. When an oxygen enriched atmosphere is provided above the biological treatment zone, i.e., about 40–70 percent oxygen, 90 percent $BOD_5$ removal can be accomplished with a loading rate from 4 to 10 gal/day/sq.ft.

In addition to substantially upgrading existing wastewater treatment plants, the method and apparatus of the invention can be the basis for new plant design. A single tank wastewater treatment plant capable of removing over 90 percent of BOD from wastewater can be provided at a fraction of the cost of a conventional activated sludge or a trickling filter plant effecting the same degree of clarification.

It should be understood that the method and apparatus of the invention have been described in relation to specific applications for illustrative purposes only. The term longitudinal baffle should read to include any horizontally disposed baffle that folds the wastewater flow between a biological treatment zone and a subjacent settling zone. Variations and modifications of the examples can be made without departing from the clear teachings and spirit of the invention. Accordingly, reference should be made to the following appended claims to determining the full scope of the invention.

We claim:
1. Method for the continuous treatment of wastewater comprising
   a. providing a treatment tank having a primary bay and at least one secondary bay horizontally adjacent to said primary bay,
   b. each of said bays including a lower settling zone and a vertically adjacent upper biological treatment zone,
   c. introducing wastewater into the lower settling zone of said primary bay,
   d. creating a flow of wastewater through the settling zone of said primary bay,
   e. vertically directing said wastewater from the settling zone to the upper biological treatment zone of said primary bay,
   f. creating a flow of wastewater through the biological treatment zone of said primary bay countercurrent to the direction of wastewater flow through the settling zone of said primary bay,
   g. horizontally directing wastewater from the biological treatment zone of said primary bay to the biological treatment zone of said secondary bay,
   h. creating a flow of said wastewater through the biological treatment zone of said secondary bay;
   i. vertically directing said wastewater from the biological treatment zone of said secondary bay into the lower settling zone of said secondary bay,
   j. creating a flow of said wastewater through the settling zone of said secondary bay countercurrent to the direction of wastewater flow through the biological treatment zone of said secondary bay, and
   k. removing said wastewater from the settling zone of said secondary bay.

2. The method of claim 1, wherein said primary bay is disposed between two secondary bays, each of said secondary bays being horizontally adjacent to said primary bay.

3. The method of claim 2, wherein said wastewater is split into substantially equal portions after passing through the biological treatment zone of said primary bay, each of said portions being directed to the biological treatment zone of one of said secondary bays.

4. The method of claim 1, wherein each of said biological treatment zones includes a plurality of partially submerged rotatable contactor members having surface suitable for the growth of aerobic biological slimes.

5. The method of claim 4, wherein said surface in disposed parallel to the direction of wastewater flow through said biological treatment zones.

6. The method of claim 4, wherein said contactor members are rotated at a peripheral velocity adequate for the growth and maintenance of aerobic biological slimes.

7. The method of claim 1, wherein said wastewater is vertically directed from the lower settling zone to the biological treatment zone of said primary bay and from the biological treatment zone of said secondary bay to the lower settling zone of said secondary bay by a longitudinal baffle disposed between said settling and biological treatment zones across the width of each of said bays and along a substantial protion of the length of each of said bays.

* * * * *